(12) United States Patent
Abercrombie et al.

(10) Patent No.: US 9,177,249 B2
(45) Date of Patent: Nov. 3, 2015

(54) SCIENTOMETRIC METHODS FOR IDENTIFYING EMERGING TECHNOLOGIES

(71) Applicant: UT-Battelle, LLC, Oak Ridge, TN (US)

(72) Inventors: Robert K. Abercrombie, Knoxville, TN (US); Bob G. Schlicher, Knoxville, TN (US); Frederick T. Sheldon, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 315 days.

(21) Appl. No.: 13/927,141

(22) Filed: Jun. 26, 2013

(65) Prior Publication Data
US 2014/0006332 A1    Jan. 2, 2014

Related U.S. Application Data

(60) Provisional application No. 61/666,015, filed on Jun. 29, 2012.

(51) Int. Cl.
*G06Q 10/06* (2012.01)
*G06N 5/02* (2006.01)
*G06Q 30/02* (2012.01)

(52) U.S. Cl.
CPC ............ *G06N 5/02* (2013.01); *G06Q 10/0637* (2013.01); *G06Q 30/0201* (2013.01); *G06Q 30/0202* (2013.01)

(58) Field of Classification Search
CPC ...................................................... G06N 5/02
See application file for complete search history.

(56) References Cited

U.S. PATENT DOCUMENTS

| | | |
|---|---|---|
| 6,385,611 B1 | 5/2002 | Cardona |
| 6,728,725 B2 | 4/2004 | Garfield et al. |
| 6,856,988 B1 | 2/2005 | Humphrey et al. |
| 7,356,416 B2 | 4/2008 | Busa |
| 7,464,025 B2 | 12/2008 | Humphrey et al. |
| 7,647,335 B1 | 1/2010 | Colecchia |
| 7,693,704 B2 | 4/2010 | Humphrey et al. |
| 7,792,786 B2 | 9/2010 | Chen et al. |

(Continued)

OTHER PUBLICATIONS

Robert K. Abercrombi, Akaninyene W. Udoeyop, Bob G. Schlicher, A study of scientometric methods to identify emerging technologies via modeling of milestones, Springer, Scientometrics 91:327-342, Publied Jan. 11, 2012.*

(Continued)

*Primary Examiner* — Alan Chen
(74) *Attorney, Agent, or Firm* — Colin L. Cini

(57) ABSTRACT

Provided is a method of generating a scientometric model that tracks the emergence of an identified technology from initial discovery (via original scientific and conference literature), through critical discoveries (via original scientific, conference literature and patents), transitioning through Technology Readiness Levels (TRLs) and ultimately on to commercial application. During the period of innovation and technology transfer, the impact of scholarly works, patents and on-line web news sources are identified. As trends develop, currency of citations, collaboration indicators, and on-line news patterns are identified. The combinations of four distinct and separate searchable on-line networked sources (i.e., scholarly publications and citation, worldwide patents, news archives, and on-line mapping networks) are assembled to become one collective network (a dataset for analysis of relations). This established network becomes the basis from which to quickly analyze the temporal flow of activity (searchable events) for the example subject domain.

22 Claims, 10 Drawing Sheets

(56) References Cited

U.S. PATENT DOCUMENTS

| | | | |
|---|---|---|---|
| 7,953,724 | B2 | 5/2011 | Griffith |
| 8,201,085 | B2 | 6/2012 | Rollins et al. |
| 2005/0149523 | A1 | 7/2005 | Humphrey et al. |
| 2010/0217731 | A1 | 8/2010 | Fu et al. |
| 2010/0268714 | A1 | 10/2010 | Moon et al. |
| 2013/0111553 | A1* | 5/2013 | Jacobs .............................. 726/3 |
| 2014/0019196 | A1* | 1/2014 | Wiggins et al. .............. 705/7.28 |

OTHER PUBLICATIONS

Erdi et al., Prediction of Emerging Technologies Based on Analysis of the US Patent Citation Network, Springer, Scientometrics, pp. 1-2 Published Jun. 21, 2012.*

Kirby et al., A Process for Tracking and Assessing Emerging Technology Development Programs for Resource Allocation, American Institute of Aeronautics & Astronautics, pp. 1-11, 2001.*

Britt et al., Document Classification Techniques for Automated Technology Readiness Level Analysis, Journal of the American Society for Information Science and Technology, 59(4)675-680, 2008.*

Biglu, Mohammad Hossein, Scientometric Study of Patent Literature in Medicine, pp. 1-5.

Boll, Sebastian, A Scientometric Method to Analyze Scientific Journals as Exemplified by the Area of Information Science, Master Thesis, pp. 1-184, Dec. 2007.

Zitt, Michael, Challenges for Scientometric Indicators: Data Demining, Knowledge-flow, Measurements and Diversity Issues, Ethics in Science and Environmental Politics, 2008, pp. 49-60, vol. 8, published online May 27, 2008.

* cited by examiner

|  | 1988 | 1989 | 1990 | 1991 | 1992 | 1993 | 1994 | 1995 | 1996 | 1997 |
|---|---|---|---|---|---|---|---|---|---|---|
| Academic Articles |  |  |  |  | 15.4 | 30.8 | 0.0 | 0.0 | 23.1 | 38.5 |
| Academic Citations |  |  |  |  | 4.1 | 0.0 | 2.0 | 0.0 | 2.0 | 2.0 |
| Patents |  |  |  |  | 0.7 | 0.7 | 2.8 | 4.2 | 12.0 | 9.2 |
| Web News Sources | 1.6 | 10.3 | 16.8 | 22.0 | 18.1 | 19.4 | 30.2 | 32.2 | 23.6 | 30.2 |
| Application Specific Product Emergence | 25.0 | 50.0 | 50.0 | 12.5 | 37.5 | 25.0 | 25.0 | 50.0 | 12.5 | 75.0 |

|  | 1998 | 1999 | 2000 | 2001 | 2002 | 2003 | 2004 | 2005 | 2006 | 2007 | 2008 |
|---|---|---|---|---|---|---|---|---|---|---|---|
| Academic Articles | 23.1 | 46.2 | 23.1 | 15.4 | 46.2 | 69.2 | 53.8 | 100.0 | 69.2 | 69.2 | 30.8 |
| Academic Citations | 6.1 | 16.3 | 20.4 | 16.3 | 22.4 | 36.7 | 38.8 | 57.1 | 49.0 | 79.6 | 100.0 |
| Patents | 8.5 | 17.6 | 29.5 | 41.5 | 39.4 | 81.7 | 71.8 | 61.3 | 65.5 | 90.8 | 100.0 |
| Web News Sources | 37.4 | 52.0 | 57.0 | 100.0 | 73.3 | 68.5 | 56.2 | 52.2 | 53.1 | 45.2 |  |
| Application Specific Product Emergence | 25.0 | 100.0 | 87.5 | 37.5 | 12.5 | 25.0 | 25.0 | 12.5 | 0.0 |  |  |

Years

Fig. 7

SCIENTOMETRIC METHODS FOR IDENTIFYING EMERGING TECHNOLOGIES

CROSS-REFERENCE TO RELATED APPLICATIONS

This application claims benefit under 35 U.S.C. 119(e) to U.S. provisional patent application Ser. No. 61/666,015, filed on Jun. 29, 2012. The entire content of which is herein incorporated by reference as if included at length.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

BACKGROUND OF THE INVENTION

1. Field of the Invention

The present disclosure relates to scientometric data analysis systems and methods and more specifically to a system and method for analyzing data related to an emerging technology and determining the Technology Readiness Level (TRL) of the technology at any given time.

2. Description of the Related Art

Scientometrics is defined as the science of measuring and analyzing science. In practice, scientometrics is often accomplished using bibliometrics, a measurement of scientific publications. Modern scientometrics is mostly based on the work of Derek J. de Solla Price and Eugene Garfield. The latter founded the Institute for Scientific Information which is heavily used for scientometric analysis. One significant finding in the field is a principle of cost escalation to the effect that achieving further findings at a given level of importance grow exponentially more costly in the expenditure of effort and resources.

With today's ability to access extremely large datasets through electronic means, such as the internet, it can be difficult to determine if a trend is developing in a certain area, sector or technology. Disparate datasets (e.g., patents, papers, articles, citations, product offerings, etc. . . . ) are typically interspersed with one another in the search results, so it's difficult to understand what level of maturity a particular technology is. This becomes even more difficult as an emerging technology matures and ever-more data becomes available for analysis by the interested party. For example, automobile technology continues to evolve and the amount of data continues to be overwhelming. In some instances, it's not uncommon to find hundreds of thousands of individual data points while searching for a topic of interest. The ability to identify trends and the Technology Readiness Level (TRL) of a technology is often impossible due to the volume of available information and its disparate nature.

Government agencies such as the National Aeronautics and Space Administration (NASA) and the Department of Defense (DoD), and numerous commercial entities have developed sets of graded definitions/descriptions of stages of TRL. An example of TRL 1-9 descriptions follow below.

TRL 1: Basic principles observed and reported. Lowest level of technology readiness. Scientific research begins to be translated into applied research and development. Examples might include paper studies of a technology's basic properties.

TRL 2: Technology concept and/or application formulated. Invention begins. Once basic principles are observed, practical applications can be invented. Applications are speculative and there may be no proof or detailed analysis to support the assumptions. Examples are limited to analytic studies.

TRL 3: Analytical and experimental critical function and/or characteristic proof of concept. Active research and development is initiated. This includes analytical studies and laboratory studies to physically validate analytical predictions of separate elements of the technology. Examples include components that are not yet integrated or representative.

TRL 4: Component and/or breadboard validation in laboratory environment. Basic technological components are integrated to establish that they will work together. This is relatively "low fidelity" compared to the eventual system. Examples include integration of "ad hoc" hardware in the laboratory.

TRL 5: Component and/or breadboard validation in relevant environment. Fidelity of breadboard technology increases significantly. The basic technological components are integrated with reasonably realistic supporting elements so it can be tested in a simulated environment. Examples include "high fidelity" laboratory integration of components.

TRL 6: System/subsystem model or prototype demonstration in a relevant environment. Representative model or prototype system, which is well beyond that of TRL 5, is tested in a relevant environment. Represents a major step up in a technology's demonstrated readiness. Examples include testing a prototype in a high-fidelity laboratory environment or in simulated operational environment.

TRL 7: System prototype demonstration in an operational environment. Prototype near, or at, planned operational system. Represents a major step up from TRL 6, requiring demonstration of an actual system prototype in an operational environment such as an aircraft, vehicle, or space. Examples include testing the prototype in a test bed aircraft.

TRL 8: Actual system completed and qualified through test and demonstration. Technology has been proven to work in its final form and under expected conditions. In almost all cases, this TRL represents the end of true system development. Examples include developmental test and evaluation of the system in its intended weapon system to determine if it meets design specifications.

TRL 9: Actual system proven through successful mission operations. Actual application of the technology in its final form and under mission conditions, such as those encountered in operational test and evaluation. Examples include using the system under operational mission conditions.

The identification of the emergence of a new technology creates funding opportunities for researchers and helps business leaders predict when capital expenditures, infrastructure improvements, and hiring is needed. It's also important for businesses to know when a technology has matured enough to evaluate what opportunities exist for expanding into the repair and service businesses. A decision concerning a financial investment in a technology will benefit from knowing what the TRL is. There are many other technical and business-oriented decisions that can be influenced by knowing the present TRL of a technology.

What is needed is a system and method for easily identifying new technology trends, and for developing a technology evolution model of a technology from disparate data sets.

BRIEF SUMMARY OF THE INVENTION

Disclosed are several examples of systems and methods for developing a technology evolution model from disparate datasets using a computer. With reference first to FIG. 1, an exemplary method will now be summarized, with complete details to follow.

Provided is a method 100 for determining a technology readiness level of a technology from one or more datasets using a computer having a processor preprogrammed with the steps comprising: 101 gathering raw data associated with the occurrence of the technology from sources and storing the raw data, over a time interval, into a distinct dataset for each source; 102 normalizing the raw data in each of the distinct datasets and creating normalized datasets; 103 identifying initial occurrences and peaks in the normalized datasets; and 104 assigning a technology readiness level indicator based on the initial occurrences and the peaks in at least one of the normalized datasets.

According to an example, a technology is searched from two or more data sets as represented by step 101 of FIG. 1. For example, the number of citations related to the technology is provided for each year. An ad-hoc network is formed from the variety of sources that when investigated in total becomes an integrated network.

Once the datasets are stored, the data sets are normalized between values of 0 and 100, with 100 being indicative of the year having the most citations and the other years being only a fractional percentage of highest year as represented by step 102 of FIG. 1. The time slice is a year in some examples, while other time slices may be used in other examples (e.g., months, decades).

With each of the datasets now normalized, the data sets can be fit with a polynomial fitting algorithm. The normalized data sets can also be analyzed for goodness of fit using the $R^2$ statistic, which explains how much of the variability exhibited by a factor can be explained by its relationship to another factor.

The normalized data sets may be presented to a human observer on a computing device monitor in a number of ways: a line chart, a bar chart, or a radar chart for example. In other examples, other charts are used to display the data.

Each of the normalized data sets is analyzed for one or more indicative characteristics such as initial occurrence, peaks, valleys, etc. . . . , which validate the sequences of the technology emergence model as represented by step 103 of FIG. 1.

Once the initial occurrence, peaks, valleys, etc. . . . , are determined from the normalized datasets, a TRL indicator is assigned as represented by step 104 of FIG. 1. In some examples, the milestone and technology readiness level indicators are assigned based on a rigid set of rules applied to the data sets. In other examples, the milestone and TRL indicators are assigned based on a proven model applied to the data sets. In other examples, trend/sensitivity analysis is used to assign the milestone and TRL indicators.

Because the TRL of a given technology may be different from data set to data set, the highest TRL of all the datasets being analyzed is typically indicative of the technology's actual TRL at a particular time.

Once the TRL is applied to the data set, certain questions may be answered and these include: at what time was the technology at a certain technology readiness level? What is the highest technology readiness level achieved thus far? Of the three technologies I'm interested in potentially implementing, what technology has the highest TRL? Is my competitor's product at a higher TRL than my competing product? When did a technology go from the public domain to a classified status? Each of these questions, and others, may be answered using the disclosed systems and methods. Accordingly, a researcher is now able to systematically develop and analyze a technology emergence model from a series of disparate data sets, which, in the past, would not be indicative of a technology readiness level.

BRIEF DESCRIPTION OF THE SEVERAL VIEWS OF THE DRAWINGS

The disclosed systems and methods may be better understood with reference to the following drawings and detailed description. Non-limiting and non-exhaustive descriptions are provided with reference to the following drawings. The components in the figures are not necessarily to scale, emphasis instead being placed upon illustrating principles. In the figures, like referenced numerals may refer to like parts throughout the different figures unless otherwise specified.

FIG. 7 is a table illustrating the exemplary raw datasets of FIGS. 2-6 normalized over a time range.

DETAILED DESCRIPTION OF THE INVENTION

Figure 1:
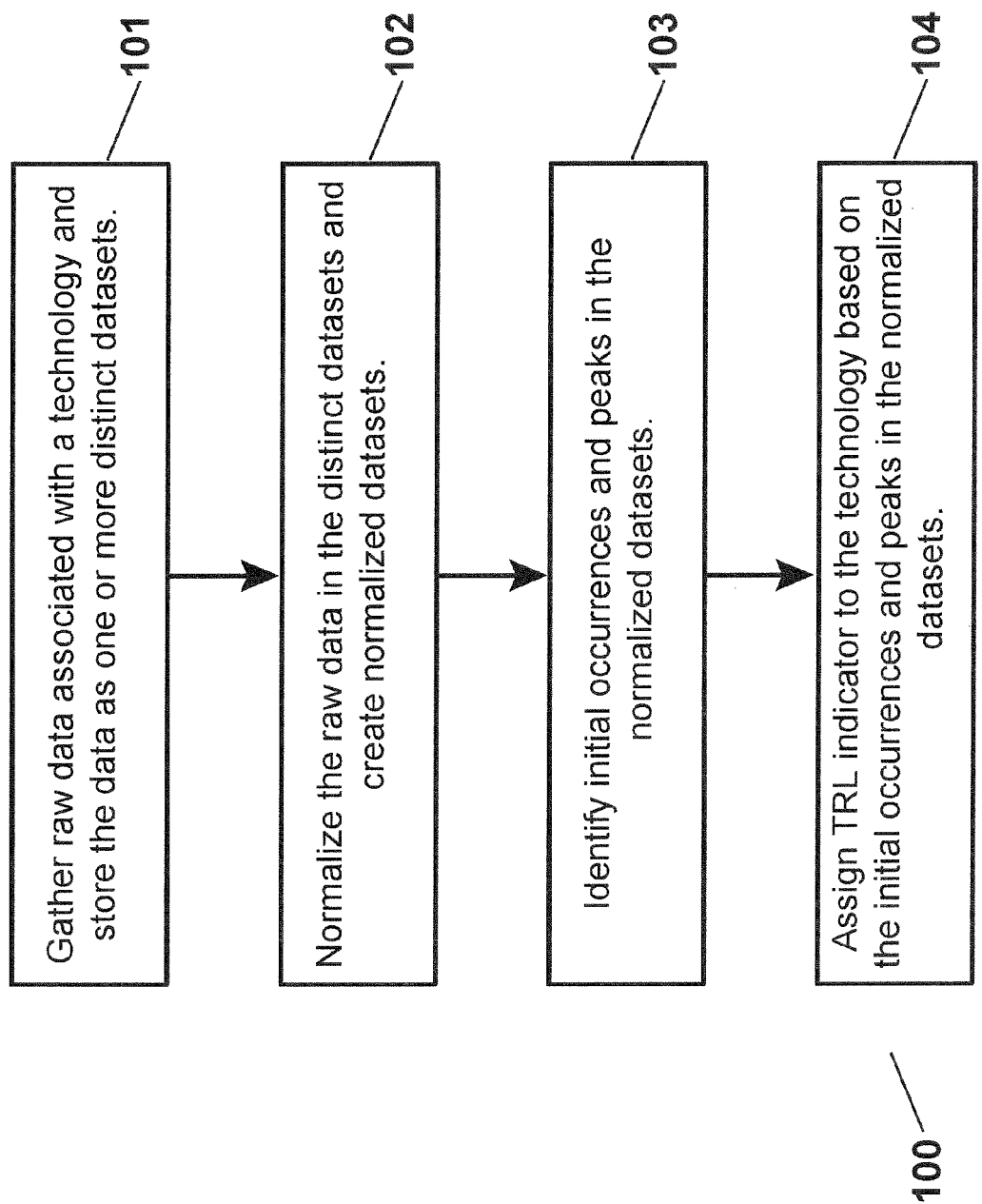
FIG. 1 is a flow chart illustrating a series of method steps performed by a computer processing device.

Technologies of interest can be better analyzed in accordance with the present disclosure. The technology of interest can be any conceptual, emerging, well-established, or fully-developed technology. Throughout the detailed description, an analysis of the Simple Network Management Protocol (SNMP) will be used in the examples. (SNMP is used in network management systems to monitor network-attached devices (hubs, routers, bridges, etc.) for conditions that warrant administrative attention.

Statistics associated with a technology are first collected from a number of data sources. Currently, one of the most comprehensive and useful approaches is to search external, online databases. A number of companies make use of online document retrieval services such as NEXIS™, Dow Jones News/Retrieval™, and Dialog™. Cambridge Scientific Abstracts™ is another portal that allows access to a large number of databases. Research reveals numerous sources that can be utilized for various purposes.

Business Information can be found using ABI/Inform at Proquest™, Hoovers On-line™, EBSO business Index™, among other databases of business articles. Press Releases can be found at LEXIS-NEXIS™, and National Technical Information Service (NTIS) provides a service to find government publications.

There are a number of other government databases that are also available. Some exemplary databases are: (1) Science Citation Index-SCI® provides access to bibliographic information, author abstracts, and cited references found in 6,500 of the world's leading scholarly science and technical journals across 150 disciplines, from 1900 to the present; (2) Chemical Abstracts Service (CAS) has indexed and summarized 23 million chemistry-related articles from more than 40,000 scientific journals, patents, conference proceedings and other documents; (3) MEDLINE is a database of abstracts maintained by the National Library of Medicine containing over 19 million abstracts from 7,300+ medical journals from 1965 to present (Currently, citations from approximately 5,600 worldwide journals in 39 languages; 60 languages for older journals. Citations for MEDLINE are created by the NLM, international partners, and collaborating organizations); (4) EI Compendex covers almost 15 million records referencing 5,000 engineering journals, conference materials and trade publications dating from 1969 (Approximately 1,000,000 new records are added to the database annually from over 190 disciplines and major specialties within the engineering field. Coverage is from 1969 to the present, and is updated weekly); (4) INSPEC, published by the Institution of Engineering and Technology (IET), and formerly by the Institution of Electrical Engineers (IEE), one of the IET's forerunners. It presently contains 10 million records from over 4,000 technical journals, 2,200 conference proceedings plus books and reports annually from over 60 countries in physics, electrical engineering, electronics, computing, control and information technology; (5) Derwent World Patents Index (DWPI), produced by Thomson Reuters Scientific, provides access to information from more than 42.5 million patent documents, giving details of over 20 million inventions. Each update, approximately 39,400 documents from 47 patent-issuing authorities are added to DWPI.; and (6) Pollution Abstracts contains almost 300,000 records on scientific research and government policies on pollution, including coverage of journal literature, conference proceedings, and hard-to-find documents with approximately 1,190 new records added monthly with coverage from 1981- present.

Internet searching via an internet search engine, as exemplified below, provides interesting information and/or lead to a new useful database(s) as well: (1) Google™ has many facets and tailored products for searching scholarly works, patents, images, video, news feeds, etc; (2) Yahoo!™ has many facets and tailored products for searching the internet; (3) AltaVista™ provides topical searches to the web, images and news articles; (4) Wolfram Alpha™ offers an alternative to web searching. Instead of searching the web for information, Alpha is built around a vast repository of curated data from public and licensed sources.; (5) Google Squared™ offers the ability of looking at the unstructured web and abstracting values and facts and information in a meaningful way in order to present it to users; and (6) Bing!™ is offered by Microsoft as an internet search engine.

These data gathering examples are not exhaustive and other databases that exist today or will exist in the future may be used. Some databases provide access to data free of charge, while others may charge the user a one-time fee or annual fee to access their data.

An enormous amount of information can be collected quickly from a variety of on-line sources today that initially seems misleading or even conflicting. This has always been a source of confusion and typically leads to inordinate or excessive amount of resources (time and money) that need to be applied to de-conflict what at first glance seems to be disparate data.

When the appropriate subject matter data is accessed from a specific data source (e.g., scholarly data, patents, web news reports, business/product starts), the temporal data is stored in computer memory according to the number of individual counts for a particular time period (e.g., year). This data is stored as a distinct dataset source entry. For example, the number of scholarly data citations related to a technology per year (e.g., 1992 (2 citations), 2003 (17 citations), 2004 (19 citations), 2005 (27 citations)). Before the emergence of a technology, there will be no scholarly data citations, and as the technology develops and evolves, more citations per year will be made.

The datasets may be stored in space delimited format, comma delimited format, binary format, or in some other format that may be stored in a non-transitory storage medium and that is readable by a computer processor. In some examples, the data may be stored in a spreadsheet format.

Once each of the raw dataset source entries is stored, they represent an ad-hoc network from a variety of sources that when investigated with the present methods become an integrated network. This network allows the disparate, on-line, dataset sources to be analyzed and better understood by the specialist. FIG. 2 through FIG. 6 illustrate the raw datasets used for the SNMP example.

Figure 8:
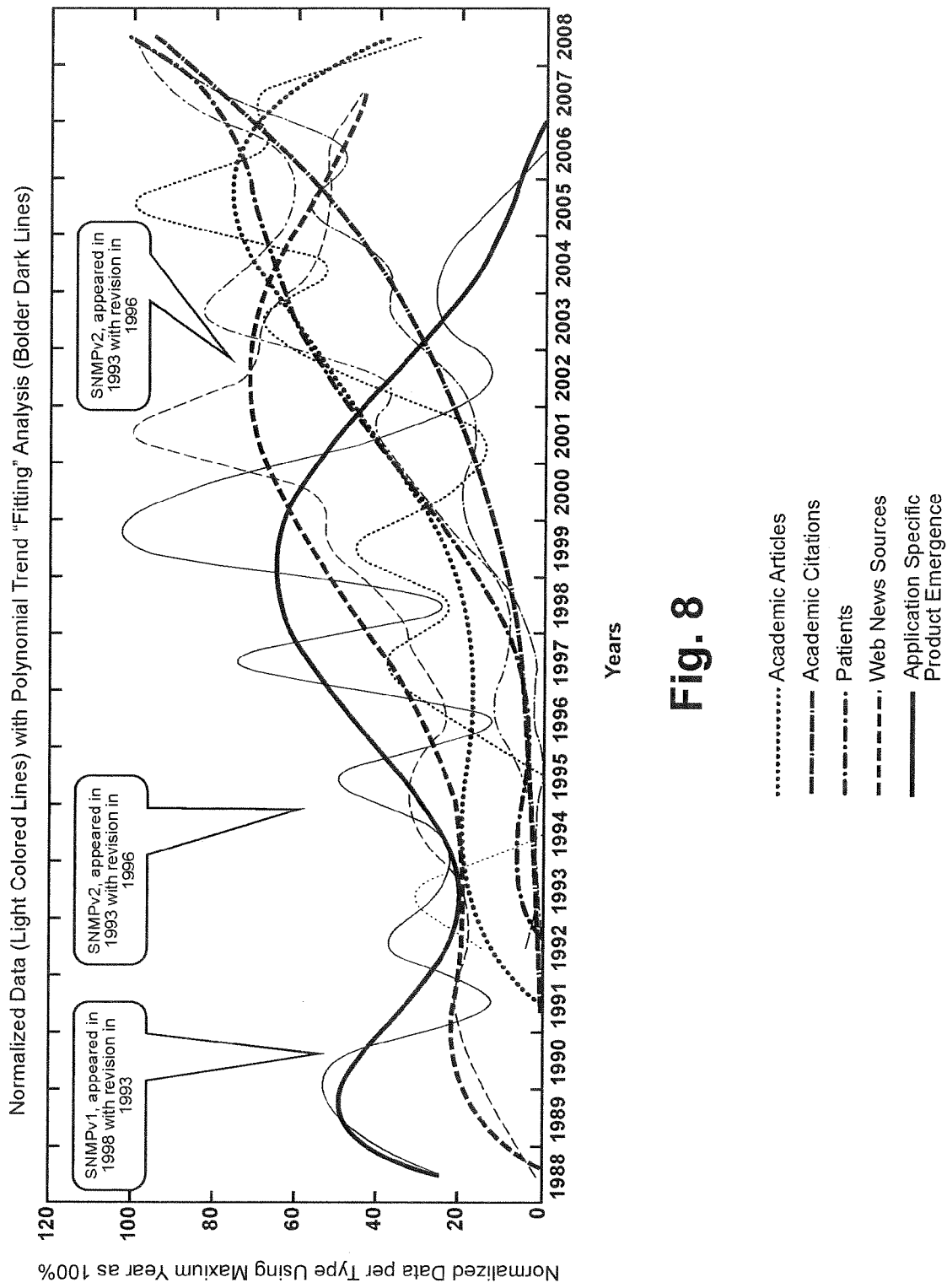
FIG. 8 is a chart illustrating exemplary a polynomial trend fit of the normalized datasets of FIG. 7.

This particular empirical trending approach is made possible by normalizing each of the distinct dataset source entries as illustrated in the table of data shown in FIG. 7. Each yearly data point is transposed to its respective percentage within its particular dataset with the maximum yearly data point count for each dataset being references as 100 percent. This allows all the disparate dataset sources to be analyzed together, on a single graph, using a common x-axis (year). FIG. 8 illustrates an example of the normalized datasets of FIG. 7 displayed on a graph with a common x-axis. Polynomial trend lines are used to fit the data sets. In this particular example, the trend lines are necessary to illustrate the trends of the data between disparate datasets across multiple years.

An $R^2$ statistic may be calculated for each of the datasets. The $R^2$ statistic describes how much of the variability of a factor can be caused or explained by its relationship to another factor. Used in trend analysis, it is computed as a value between 0 (0 percent) and 1 (100 percent), thus the higher the value, the better the fit. Symbolized by $R^2$ because it is square of the coefficient of correlation symbolized by 'r', it is an important tool in determining the degree of linear-correlation of variables (goodness of fit) in regression analysis.

In the SNMP example, Academic articles peaked during 2005, are strong during 1999, 2002-2004, 2006-07, and are weakest during 1994-1999, 2008. Trend line $y=-0.0186x^4+0.8633x^3-13.687x^2+90.133x-192.01$ with $R^2=0.6926$. Academic citations peaked during 2008, are strong during 2004-2007, and are weakest during 1992-2003. Trend line $y=0.0014x^5-0.0796x^4+1.5753x^3-13.139x^2+46.858x-37.783$ with $R^2=0.8611$. Patents peaked 2008, are strong during 2001-2007, and are weakest during 1992-2000. Trend line $y=0.0028x^5-0.1793x^4+4.3787x^3-49.781x^2+264.54x-524.58$ with $R^2=0.9462$. Web New Sources peaked 2002, are strong during 2000-2001, 2003-2008, are relatively flat and weakest during 1988-1999. Trend line $y=0.0014x^5-$ $0.0796x^4+1.5753x^3-13.139x^2+46.858x-37.783$ with $R^2=0.8611$. Application specific product emergence or company startups peaked during 1999; are strong during 1989-1990, 1995, 1997, 2000, and are relatively flat and weakest during 1988, 1991-1994, 1996, 1998, and 2001-2008. Trend line $y=-0.0004x^6+0.0259x^5-0.6781x^4+8.3992x^3-49.445x^2+122.87x-56.16$ with $R^2=0.4799$.

In this SNMP example, three of the five datasets (Academic Citations, Patents, and Web New Sources) have relatively high $R^2$ values (0.8611, 0.9462, and 0.8611 respectively); one dataset has a reasonably high $R^2$ value (Academic Articles: 0.6926); and only one dataset has a relatively weak $R^2$ value (Application specific product emergence: 0.4799).

The datasets assembled from these disparate sources highlight emerging trends and allow conclusions to be drawn by the analyst. This would not be possible from any one of the distinct datasets when taken alone.

The computer processor is preprogrammed with a series of instructions for analyzing each point in each dataset in order to identify the initial occurrence of data, and the peaks and valleys of the data over the timeframe of interest (e.g., years). This is done using regression analysis of the datasets and calculating the years when maxima and minima points occur. In the specific SNMP example illustrated, the patent dataset initially appears in 1992, and it gradually increases until it reaches its maximum value in 2008. The Application Specific Product Emergence dataset initially appears in 1988 and peaks in 1999 before decreasing through 2005 and then ending thereafter.

Analysis of the patterns present in the normalized datasets will identify technology milestones and TRL transitions. TRL values tend to increase as scientific, conference and patent grants are made. Activity such as literature trends up and down, patent trends, conference progression from papers to topics to sessions to independent conferences, a topic moving across journal types from basic to applied research are also indicative of TRL transition points.

The methodologies for assignment of TRL milestones and transitions by the computer processor will now be discussed. The datasets used in these examples are: Scholarly Data (Publications and Citations); Patent Data; Web News Data Sources; and Business/Product Starts. While these specific datasets were used for this SNMP example, more or less datasets may be used, and the datasets may be named differently in other examples.

Figure 2:
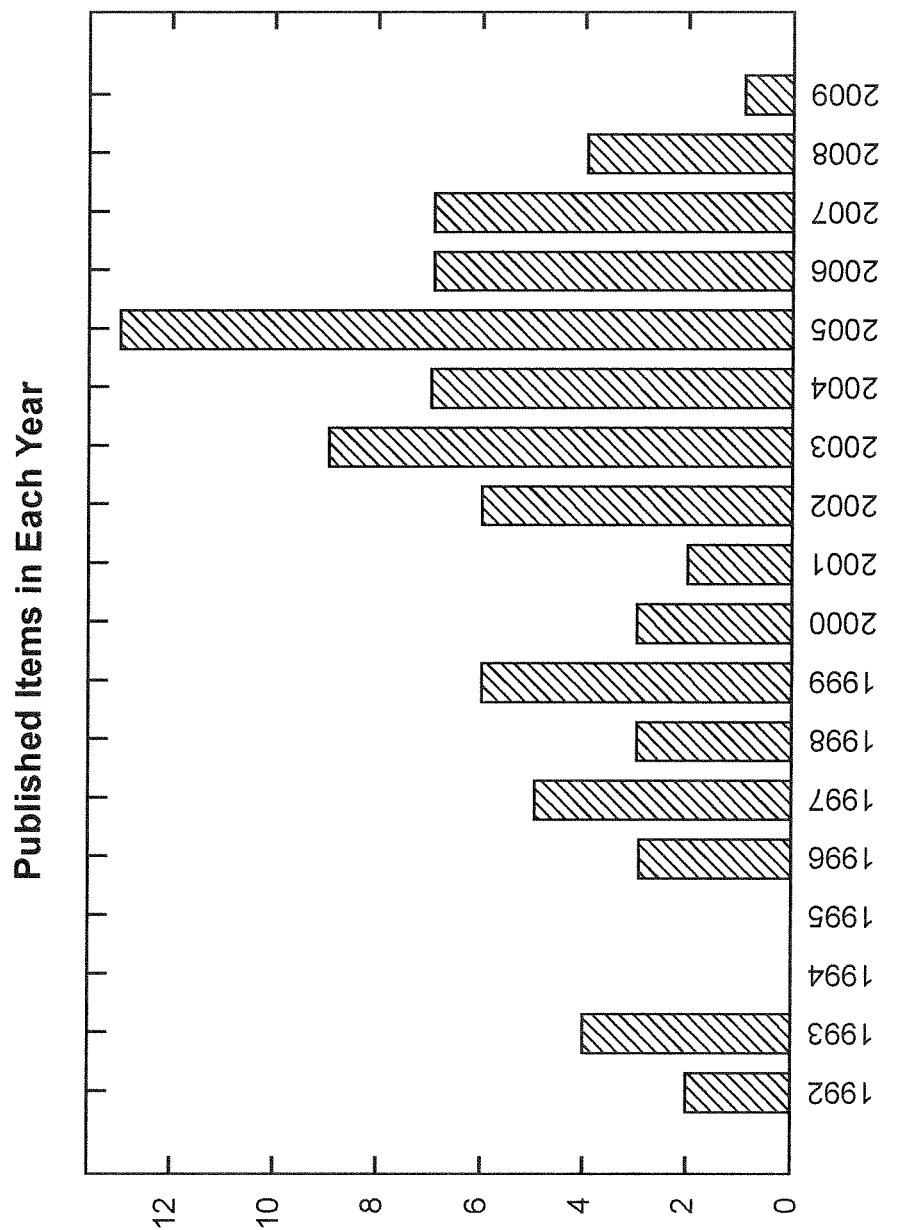
FIG. 2 is a bar chart illustrating an example of a raw dataset, representing the number of publications describing a technology by year of publication.
Figure 3:
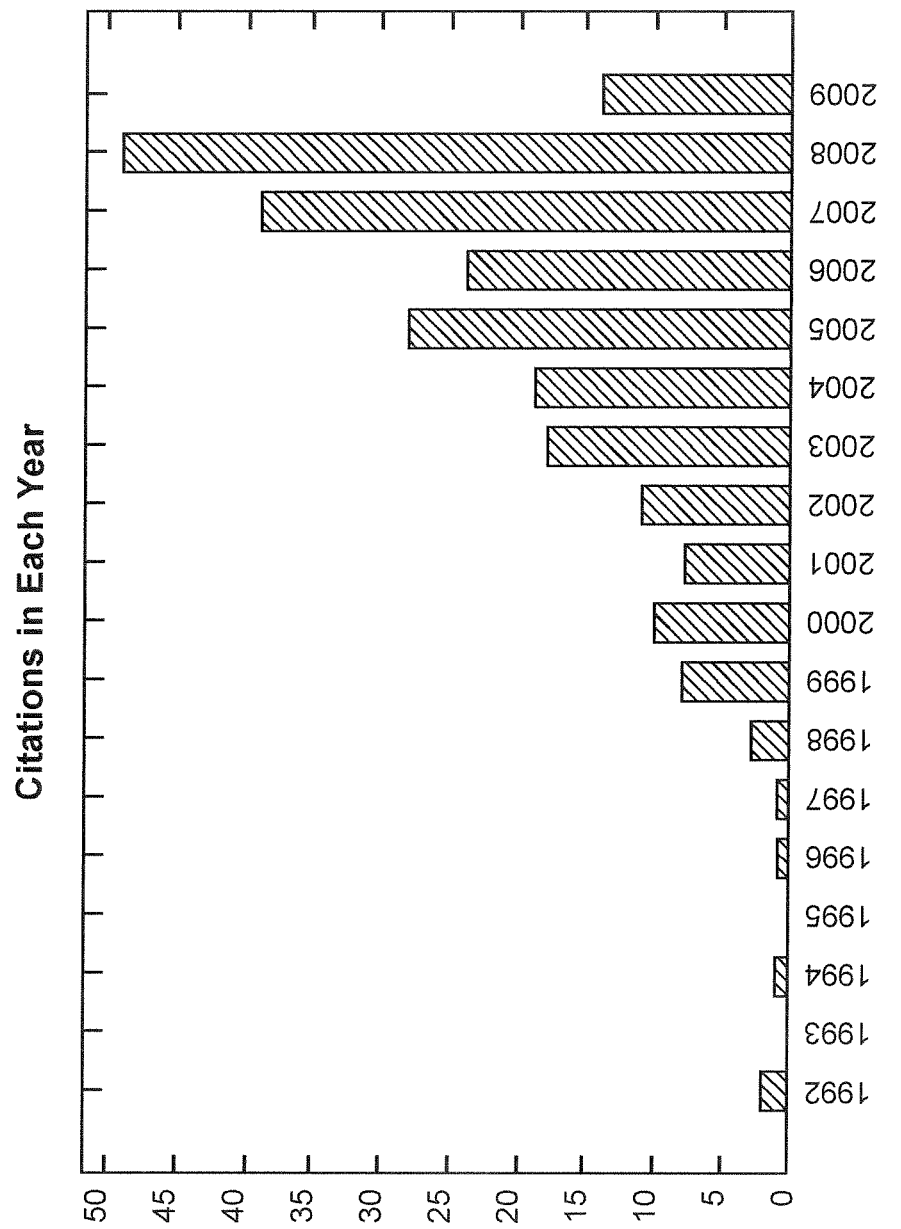
FIG. 3 is a bar chart illustrating an example of a raw dataset, representing the number of citations referencing a technology by year of citation.

In the SNMP example used throughout this application, the Scholarly Data (Publications and Citations) dataset was acquired using the ISI Web of Knowledge database, although one or more other databases could be used as well. FIGS. 2 and 3 illustrate the scholarly data trends related to SNMP, publications and citations, from 1992 through the beginning of 2009. For the purposes of this example only complete yearly data were analyzed for trends.

Figure 4:
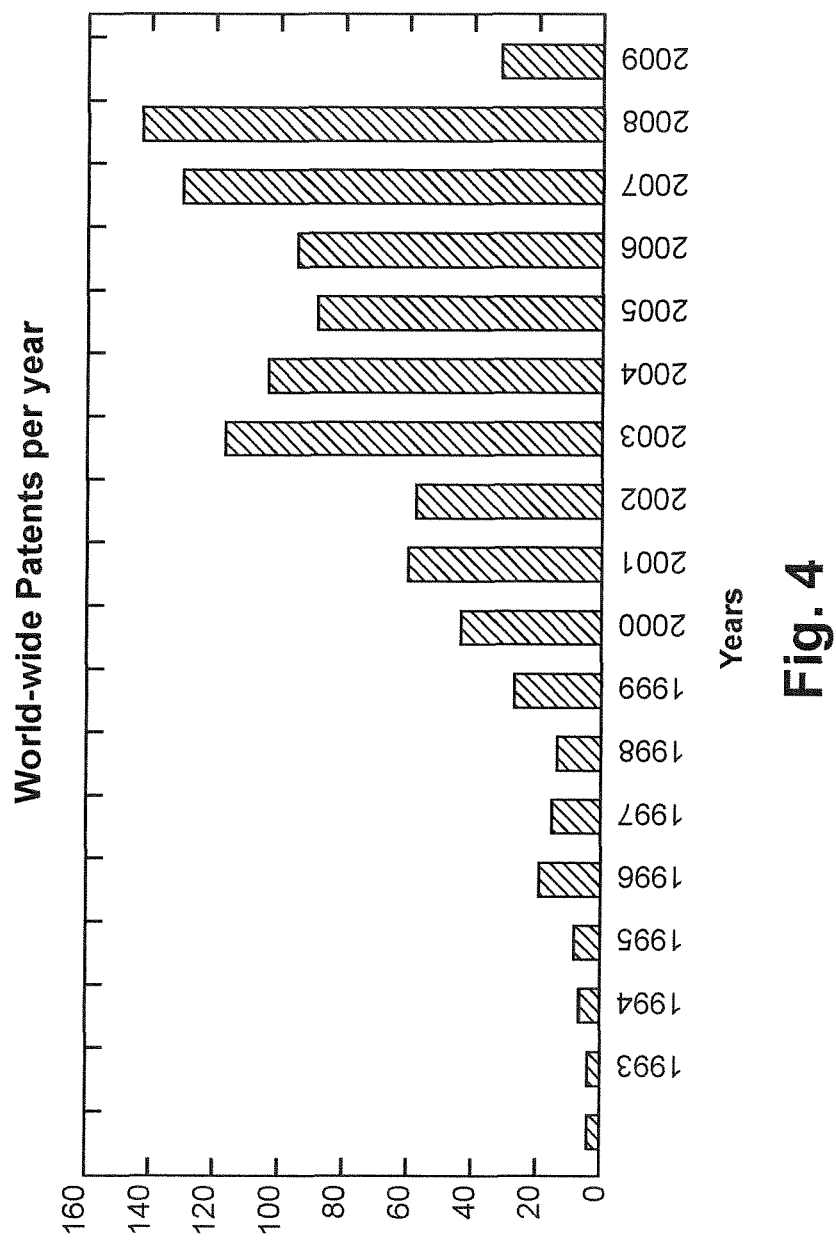
FIG. 4 is a bar chart illustrating an example of a raw dataset, representing the number of patents world-wide describing a technology by year of patent grant.

The Patent Data dataset was collected from Thompson Innovation and it contained sixty-four (64) unique fields across a dataset of 935 patents ranging from 1992 to the first three months of 2009. For this example, we only analyzed data through the last complete year, 2008. Our results show 904 patents related to SNMP from 1992-2008. FIG. 4 illustrates worldwide patent data as number of granted patents per year.

Figure 5:
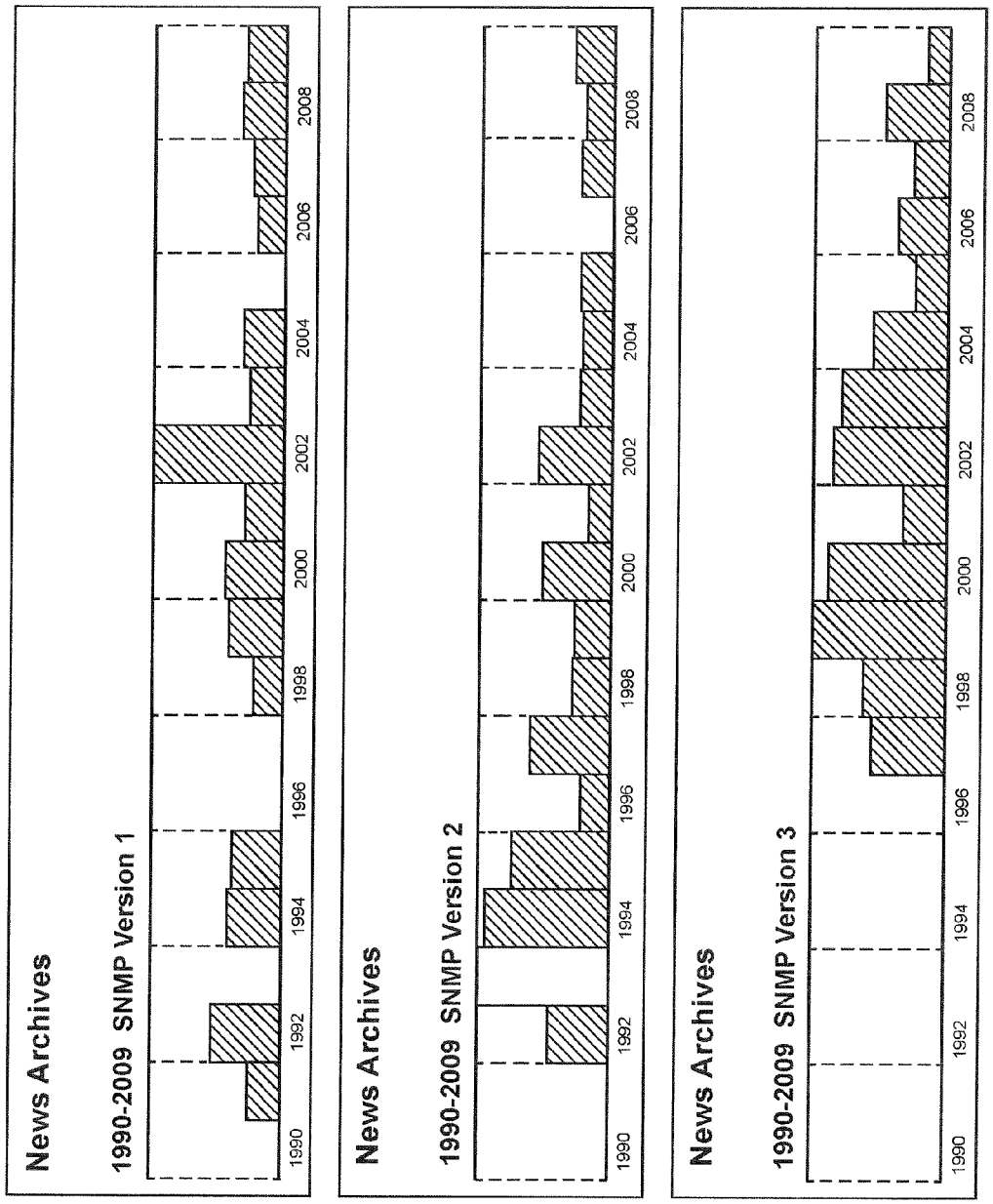
FIG. 5 is three bar charts illustrating an example of raw datasets, representing the number of Web News Data Sources describing an evolving technology by year.

The Web News Data Sources dataset was collected from Google News. This data provides an opportunity to model social networks and to determine trends with respect to sentiment and excitement (popularity) and how long this activity lasts over a number of years. FIG. 5 represents the counts of articles per year in three bar graphs of versions SNMP v1 (Top Chart), SNMP v2 (Center Chart), and SNMP v3 (Bottom Chart) respectively.

Figure 6:
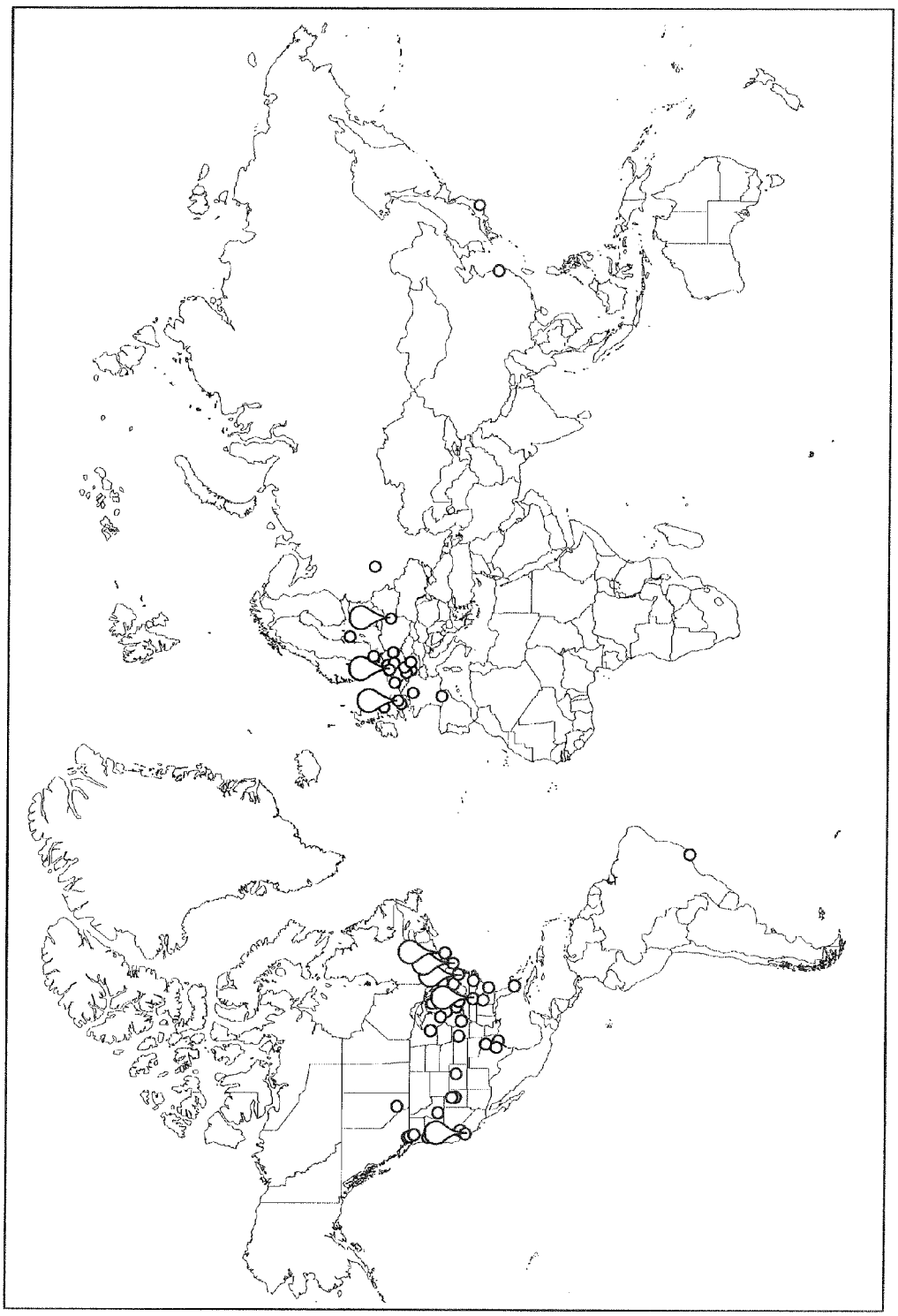
FIG. 6 is a map illustrating an example of a raw dataset representing the number of companies associated with a technology by year.

The Business/Product Starts dataset was collected from Google Maps. The search criteria from the Web News feed acquisition was expanded to "Simple Network Management Protocol". FIG. 6 identifies the initial search and interactive display from which the refinement began. The initial dataset contained 333 entries. Further refinement of each reference site, narrowed the dataset to 56 distinct entities. These were identified as either new company starts or new products from established companies.

The combination of the datasets from the previously defined four distinct and separate on-line sources become the collective dataset used to quickly and inexpensive analyze the temporal flow of the SNMP subject domain from initial discovery to critical discovery through transitions of TRL product/application availability to ultimately an enterprise relevant application, while tracking the news media interest.

Each of the normalized datasets contributes in full or in part to the TRL level determinations by the computer processor as described in even greater detail below.

TRL 1 is assigned by the computer processor from the Scholarly Data (Publications and Citations) dataset. The year when a first publication describing the technology is made indicates the year when TRL 1 is attained.

TRL 2 is assigned by the computer processor entirely from the Scholarly Data (Publications and Citations) dataset. Two data items contribute to the TRL 2 calculation: the number of publications and the number of citations. The contribution of the number of publications includes the year when academic paper publications become prominent, for example, the first year when up to 5 papers are published, or the first year when up to 10 papers are published, or the first year when up to 15 papers are published, or the first year when up to 20 papers are published. The year when one of the above criteria is met, along with the first year when a publication is cited by another author's publication, indicates the year when TRL 2 is attained.

TRL 3 is assigned by the computer processor from the contributions of three datasets: Scholarly Data (Publications and Citations); Patent Data; and Web News Data Sources. The Scholarly Data (Publications and Citations) dataset is used to calculate the year when TRL 2 is reached as described immediately above. The Patent Data dataset is used to calculate the year when patent grants peak for the technology, irrespective of Assignee Name. The Web News Data Sources dataset is used to calculate the year when first news data sources (e.g., media hype) is prevalent, for example, the first year when up to 10 news data sources appear, or the first year when up to 20 news data sources appear, or the first year when up to 30 news data sources appear. Each of the above-described data sources is weighed equally and the latest date is the year when TRL 3 is attained.

TRL 4 is assigned by the computer processor from the Patent Data dataset. The year when a first patent grant is made indicates the year when TRL 4 is attained. The first granted patent for the technology, irrespective of Assignee Name, may be a patent granted in the United States of America or in another country.

TRL 5 is assigned by the computer processor from the Patent Data dataset. The year when the highest number of patent grants is made indicates the year when TRL 5 is attained. The highest number of granted patents for the technology, irrespective of Assignee Name, may be patents granted only in the United States of America or the highest number of unique patents granted in all countries.

TRL 6 is assigned by the computer processor from the Patent Data dataset. The year when the highest number of patent grants is made indicates the year when TRL 6 is attained. The highest number of granted patents for the technology, irrespective of Assignee Name, may be patents granted only in the United States of America or the highest number of unique patents granted in all countries.

TRL 7 is assigned by the computer processor from the contributions of three datasets: Patent Data; Web News Data Sources; and Business/Product Starts. The Patent Data dataset is used to calculate the year when patent grants peak by technology and Assignee (Company) Name. The Web New Data Sources dataset is used to calculate the first year when there is an announcement of a product offering or product launch. The Business/Product Starts dataset is used to calculate the year there is an announcement of a product offering or product launch. Each of the above-described data sources is weighed equally and the latest date is the year when TRL 7 is attained.

TRL 8 is assigned by the computer processor from the Business/Product Starts dataset. The Business/Product Starts dataset is used to calculate the year when there is a first announcement of a product offering or of a product launch. The year when a first announcement of a product offering or a product launch is made indicates the year when TRL 8 is attained.

TRL 9 is assigned by the computer processor from the Business/Product Starts dataset. The Business/Product Starts dataset is used to calculate the year when there is multiple product offerings made and this indicates the year when TRL 9 is attained. For example, the first year when up to 10 product offerings appear, or the first year when up to 20 product offerings appear, or the first year when up to 30 product offerings appear.

Please note that the TRL assignment steps described above do not have to be executed in series and may be executed in parallel to speed up the TRL assignment process. In some examples, a TRL level is entered and the earliest year that the TRL level is attained is calculated.

Figure 9:
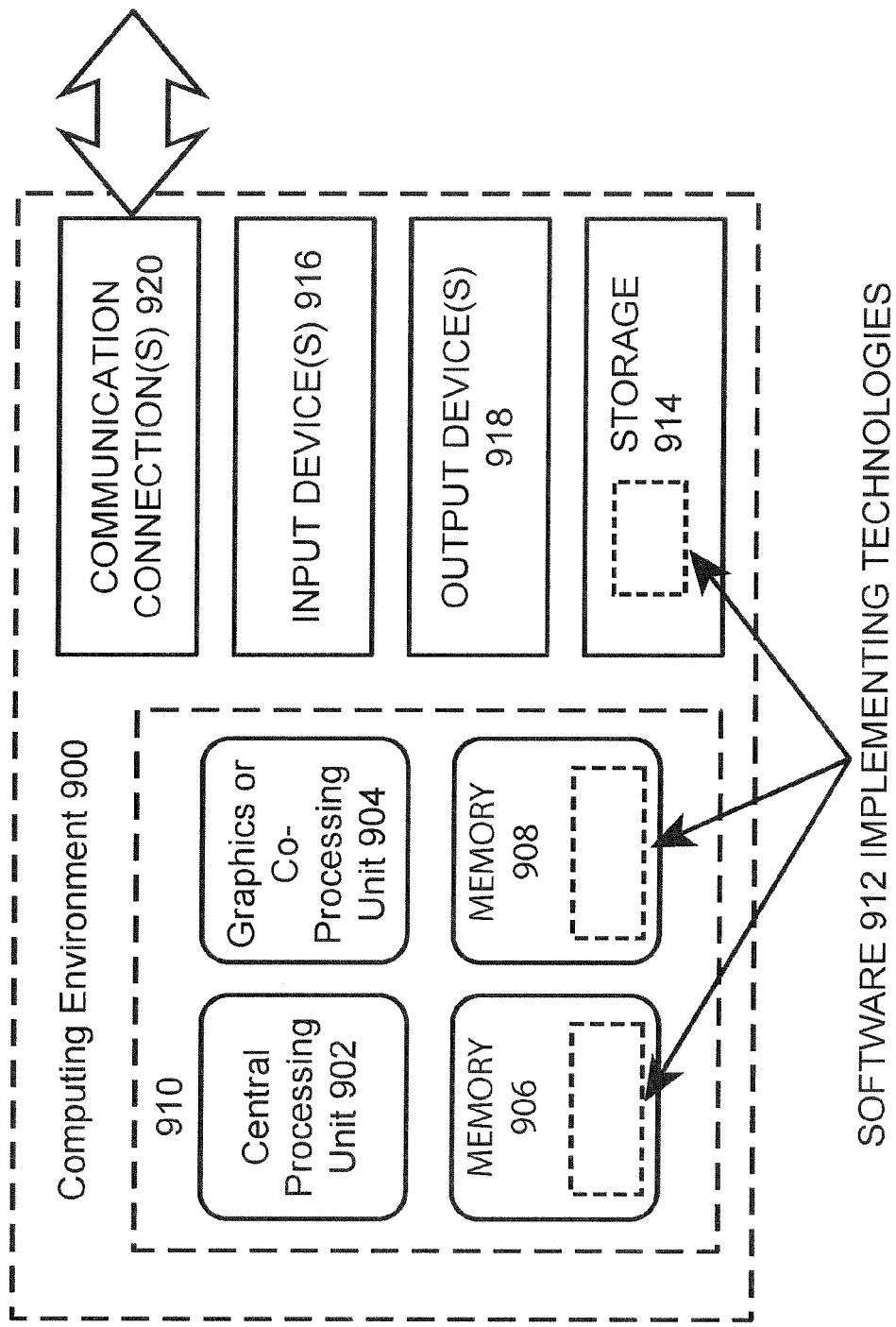
FIG. 9 is a schematic diagram of an exemplary computing system in which described embodiments can be implemented.

FIG. 9 illustrates a generalized example of a suitable computing system 900 in which the above described innovations may be implemented. The computing system 900 is not intended to suggest any limitation as to scope of use or functionality, as the innovations may be implemented in diverse general-purpose or special-purpose computing systems.

The computing system 900 includes one or more processing units 902, 904 and memory 906, 908. In FIG. 9, this basic configuration 910 is included within a dashed line. The processing units 902, 904 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power and reduce processing time. For example, FIG. 9 shows a central processing unit 902 as well as a graphics processing unit or co-processing unit 904. The tangible memory 906, 908 may be volatile memory (e.g., registers, cache, RAM), non-volatile memory (e.g., ROM, EEPROM, flash memory, etc.), or some combination of the two, accessible by the processing unit(s). The memory 906, 908 stores software 912 implementing one or more innovations described herein, in the form of computer-executable instructions suitable for execution by the processing unit(s).

A computing system may have additional features. For example, the computing system 900 includes storage 914, one or more input devices 916, one or more output devices 918, and one or more communication connections 920. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 914 may be removable or non-removable, and includes magnetic disks, magnetic tapes or cassettes, CD-ROMs, DVDs, or any other medium which can be used to store information in a non-transitory way and which can be accessed within the computing system 900. The storage 914 stores instructions for the software 912 implementing one or more innovations described herein.

The input device(s) 916 may be a touch input device such as a keyboard, mouse, pen, or trackball, a voice input device, a scanning device, or another device that provides input to the computing system 900. For video encoding, the input device(s) 916 may be a camera, video card, TV tuner card, or similar device that accepts video input in analog or digital form, or a CD-ROM or CD-RW that reads video samples into the computing system 900. The output device(s) 918 may be a display, printer, speaker, CD-writer, or another device that provides output from the computing system 900.

The communication connection(s) 920 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 10:
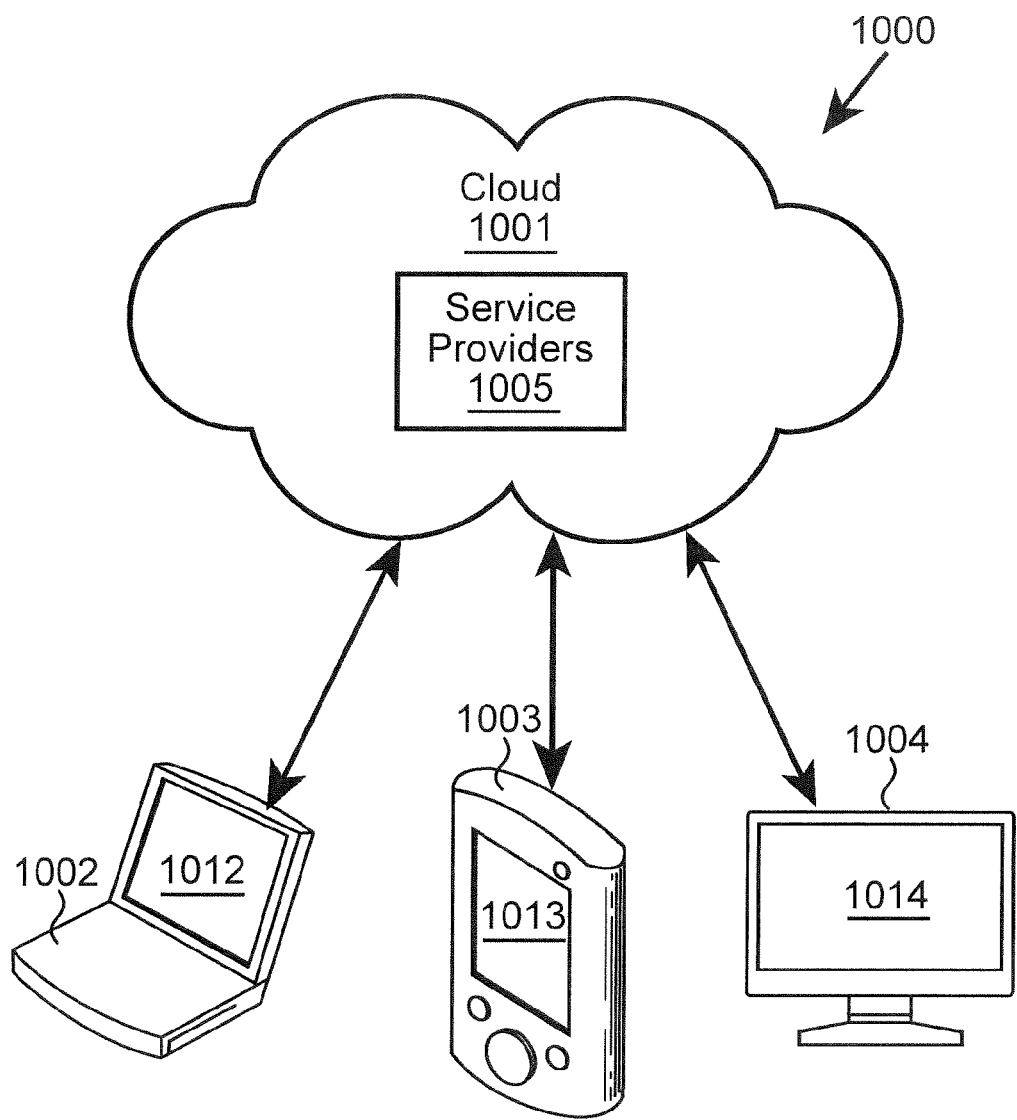
FIG. 10 is a schematic diagram of an exemplary cloud-support environment that can be used in conjunction with the technologies described herein.

In example environment 1000 of FIG. 10, the cloud 1001 provides services for connected devices 1002, 1003, 1004 with a variety of screen capabilities. Connected device 1002 represents a device with a computer screen 1012 (e.g., a mid-size screen). For example, connected device 1002 could be a personal computer such as desktop computer, laptop, notebook, netbook, or the like. Connected device 1003 represents a device with a mobile device screen 1013 (e.g., a small-size screen). For example, connected device 1003 could be a mobile phone, smart phone, personal digital assistant, tablet computer, and the like. Connected device 1004 represents a device with a large screen 1014. For example, connected device 1004 could be a television screen (e.g., a smart television) or another device connected to a television (e.g., a set-top box or gaming console) or the like. One or more of the connected devices 1002, 1003, 1004 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1001 can provide services for one or more computers (e.g., server computers) without displays.

Services can be provided by the cloud 1001 through service providers 1005, or through other providers of online services (not depicted). For example, cloud services can be customized to the screen size, display capability, and/or touch screen capability of a particular connected device (e.g., connected devices 1002, 1003, 1004).

In example environment 1000, the cloud 1001 provides the technologies and solutions described herein to the various connected devices 1002, 1003, 1004 using, at least in part, the service providers 1005. For example, the service providers 1005 can provide a centralized solution for various cloud-based services. The service providers 1005 can manage service subscriptions for users and/or devices (e.g., for the connected devices 1002, 1003, 1004 and/or their respective users).

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

While this disclosure describes and enables several examples of a system and method for analyzing data related to an emerging technology and determining its TRL level, other examples and applications are also contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. A method for determining a technology readiness level of a technology from one or more datasets using a computer having a processor preprogrammed with the steps comprising:
   a) gathering raw data associated with the occurrence of the technology from sources and storing the raw data, over a time interval, into a distinct dataset for each source;
   b) normalizing the raw data in each of the distinct datasets and creating normalized datasets;
   c) identifying initial occurrences and peaks in the normalized datasets;
   d) assigning a technology readiness level indicator based on the initial occurrences and the peaks in at least one of the normalized datasets.

2. The method as recited in claim 1 wherein the sources comprise Scholarly Data, Patent Data, Web News Data, and Business and Product Starts Data.

3. The method as recited in claim 2 wherein the assigning step d) uses one or more rules to assign a technology readiness level indicator to the technology.

4. The method as recited in claim 3 wherein the technology readiness level is the highest technology readiness level indicator of all of the technology readiness level indicators assigned in step d).

5. The method as recited in claim 2 wherein the assigning step d) uses one or more rules to assign a plurality of technology readiness level indicators for the technology to form a technology evolution model.

6. The method as recited in claim 5 wherein TRL 1 is assigned in the year when a first publication describing the technology appears in the normalized dataset derived from the Scholarly Data source.

7. The method as recited in claim 5 wherein TRL 2 is assigned in the year when up to 20 papers are published and the first year when a publication is cited by another author's publication appears in the normalized dataset derived from the Scholarly Data source.

8. The method as recited in claim 7 wherein TRL 2 is assigned in the year when up to 15 papers are published and the first year when a publication is cited by another author's publication appears in the normalized dataset derived from the Scholarly Data source.

9. The method as recited in claim 7 wherein TRL 2 is assigned in the year when up to 10 papers are published and the first year when a publication is cited by another author's publication appears in the normalized dataset derived from the Scholarly Data source.

10. The method as recited in claim 7 wherein TRL 2 is assigned in the year when up to 5 papers are published and the first year when a publication is cited by another author's publication appears in the normalized dataset derived from the Scholarly Data source.

11. The method as recited in claim 5 wherein TRL 3 is assigned in the latest of the year when up to 20 papers are published and the first year when a publication is cited by another author's publication appears in the normalized dataset derived from the Scholarly Data source, or the year when patent grants peak for the technology, irrespective of Assignee Name, appears in the normalized dataset derived from Patent Data source, or the first year when up to 30 news data sources appear in the normalized dataset derived from the Web News Data Sources dataset.

12. The method as recited in claim 11 wherein TRL 3 is assigned in the latest of the year when up to 15 papers are published and the first year when a publication is cited by another author's publication appears in the normalized dataset derived from the Scholarly Data source, or the year when patent grants peak for the technology, irrespective of Assignee Name, appears in the normalized dataset derived from Patent Data source, or the first year when up to 30 news data sources appear in the normalized dataset derived from the Web News Data Sources dataset.

13. The method as recited in claim 11 wherein TRL 3 is assigned in the latest of the year when up to 10 papers are published and the first year when a publication is cited by another author's publication appears in the normalized dataset derived from the Scholarly Data source, or the year when patent grants peak for the technology, irrespective of Assignee Name, appears in the normalized dataset derived from Patent Data source, or the first year when up to 30 news data sources appear in the normalized dataset derived from the Web News Data Sources dataset.

14. The method as recited in claim 11 wherein TRL 3 is assigned in the latest of the year when up to 5 papers are published and the first year when a publication is cited by another author's publication appears in the normalized dataset derived from the Scholarly Data source, or the year when patent grants peak for the technology, irrespective of Assignee Name, appears in the normalized dataset derived from Patent Data source, or the first year when up to 30 news data sources appear in the normalized dataset derived from the Web News Data Sources dataset.

15. The method as recited in claim 5 wherein TRL 4 is assigned in the first year when patent grants issue for the technology, irrespective of Assignee Name, appear in the normalized dataset derived from Patent Data source.

16. The method as recited in claim 5 wherein TRL 5 is assigned in the year when the maximum number patent grants issue for the technology, irrespective of Assignee Name, appears in the normalized dataset derived from Patent Data source.

17. The method as recited in claim 5 wherein TRL 6 is assigned in the year when the maximum number patent grants issue for the technology, irrespective of Assignee Name, appears in the normalized dataset derived from Patent Data source.

18. The method as recited in claim 5 wherein TRL 7 is assigned in the latest of either the first year when patent grants by technology and Assignee (Company) Name appear in the normalized dataset derived from Patent Data source, or the first year when an announcement of a product offering or product launch appears in the normalized dataset derived from The Web New Data Sources source, or the first year an announcement of a product offering or product launch appears in the normalized dataset derived from The Business/Product Starts dataset.

19. The method as recited in claim 5 wherein TRL 8 is assigned in the year when there is a first announcement of a product offering or of a product launch appears in the normalized dataset derived from the Business/Product Starts dataset.

20. The method as recited in claim 5 wherein TRL 9 is assigned in the year when up to 30 product offering or product launches appear in the normalized dataset derived from the Business/Product Starts dataset.

21. The method as recited in claim 20 wherein TRL 9 is assigned in the year when up to 20 product offering or product launches appear in the normalized dataset derived from the Business/Product Starts dataset.

22. The method as recited in claim 20 wherein TRL 9 is assigned in the year when up to 10 product offering or product launches appear in the normalized dataset derived from the Business/Product Starts dataset.

* * * * *